United States Patent [19]

Kotegawa et al.

[11] Patent Number: 4,915,511
[45] Date of Patent: Apr. 10, 1990

[54] ROLLER CHAIN

[75] Inventors: Katsumi Kotegawa; Makoto Kanehira; Kiyofumi Suzuki; Shinichi Hayashi; Hidekazu Adachi, all c/o Tsubakimoto Chain Co., 17-88, Tsurumi 4-chome, Tsurumi-ku, Osaka-Shi, Osaka-fu, Japan

[73] Assignee: Tsubakimoto Chain Co., Osaka, Japan

[21] Appl. No.: 878,688

[22] Filed: Jun. 26, 1986

[30] Foreign Application Priority Data

Jun. 26, 1985 [JP] Japan .................................. 60-140890

[51] Int. Cl.⁴ ............................................. F16C 21/00
[52] U.S. Cl. .................................... 384/127; 384/564; 384/586
[58] Field of Search ................. 384/58, 126, 127, 452, 384/543, 549, 564, 569, 586; 198/851, 779; 474/207, 209

[56] References Cited

U.S. PATENT DOCUMENTS

| 3,316,035 | 4/1967 | Zuber .................................. 384/127 |
| 3,596,533 | 9/1971 | Nightingale ..................... 384/127 X |
| 4,408,806 | 10/1983 | Orain ............................... 384/452 X |
| 4,512,729 | 4/1985 | Sakamoto et al. .............. 384/452 X |
| 4,601,592 | 2/1986 | Jatczak et al. .................. 384/902 X |

FOREIGN PATENT DOCUMENTS 54852  6/1982  European Pat. Off. ............ 384/127

Primary Examiner—David Werner
Attorney, Agent, or Firm—Stevens, Davis, Miller & Mosher

[57] ABSTRACT

A roller chain having plural bearing rollers located around the outer-periphery of a bushing, rollers surrounding the plural bearing rollers and thrust rings located at the gaps between rollers and inner link plate. The running resistance, abrasion and durability against the lateral force of the chain are improved.

9 Claims, 2 Drawing Sheets

ROLLER CHAIN

BACKGROUND OF THE INVENTION

This invention relates to a roller chain, more particularly a roller chain used for conveyance.

A roller chain especially used for conveyance is commonly provided with rollers which roll on a guide or the like. Therefore, in order to accomplish smooth rolling of the rollers and to reduce the running resistance of the chain, a chain having bearing rollers disposed between the rollers and the bushing has been proposed.

In a roller chain, for example as illustrated in FIG. 7, the bearing rollers B are held at the cavity portion of the rollers A and additionally a guide ring E is placed at the gap between the end-surface of the bearing rollers B and the inner-surface of the inner link plate D.

However the rolling resistance of the rollers of such a chain can be reduced, the lateral load acting on the rollers A is transmitted to the bearing rollers B through the part F where the inside-surface of the cavity portion and the end-surface of the bearing rollers B are in contact with each other. Also, the lateral load is sustained by the link plate D. through the part G where the end-surface of the bearing rollers B and the inside-surface of the guide ring B are in contact with each other and the outside-surface of the guide ring B.

Moreover, in such a roller chain, the radial length of the parts F, G has been restricted to be not in excess of 30% of the diameter of the bearing roller B, because of the dimentional restriction of the chain. Therefore, each parts F, G is not wide enough to sustain a large lateral load. Consequently, in case that the parts F, G are worn away, the lateral play of the roller A is increased up to the total amount of each abrasion. Furthermore, for reducing the abrasion, it is necessary to lubricate the contact parts e.g. F and G. Because, the chain having the guide ring E disposed between the bearing rollers B and the inner link plate D reduces the volume of the space between the roller A and the bushing C, this results in decrease of the lubricant such as grease reserved therein, and consequent acceleration of the deterioration of the lubricant and shortening the life of the chain.

STATEMENT OF OBJECTS

The object of this invention is to provide a roller chain improved in durability against a lateral load acting on the roller by the thrust rings and in running life thereof.

Other objects and advantages of this invention will be apparent during the course of the following description.

DETAILED DESCRIPTION

Figure 1:
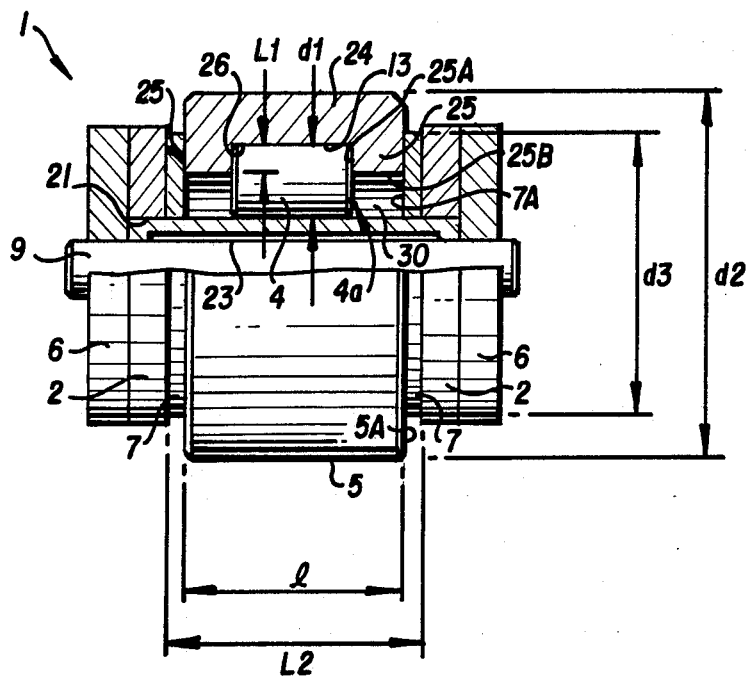
FIG. 1 is a sectional view disclosing a preferred embodiment of this invention.
Figure 2:
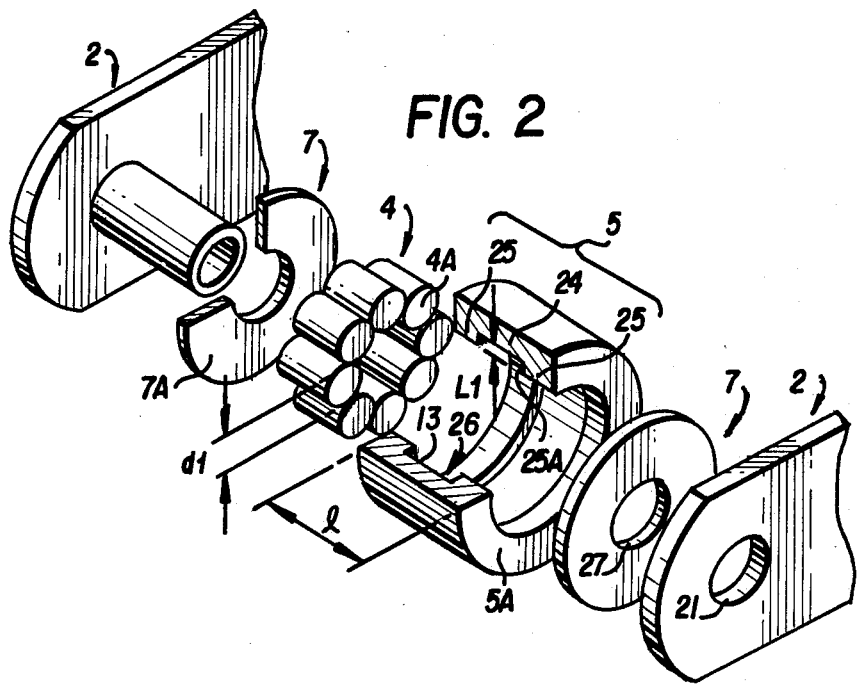
FIG. 2 is an exploded view in perspective of a portion of FIG. 1 to better illustrate the construction thereof.

Referring to FIGS. 1 and 2, a roller chain 1 comprises plural bearing rollers 4 located around a bushing 3 which interconnects oppositely disposed inner link plates 2,2, a roller 5 which surrounds said plural bearing rollers 4, and thrust rings 7,7 which are located at the gaps between said roller 5 and said inner link plates 2,2. In this embodiment, roller chain 1 is shown as a conveyor chain.

The inner link plates 2, as well as the outer link plate 6, made of punched parts of a metal plate, are of the same shape and ends of both are in the form of a semicircle. The inner link plates 2,2 oppositely disposed are connected by the bushing 3 which is press-fitted tightly into pitch hole 21 located at the pitch point. The outer link plates 6,6 are located outside the inner link plates 22, with their pitch points being alternately in coincidence. And by the chain pin 9 which passes through the bushing 3 and of which both ends are press-fitted into the pitch holes of outer link plates 6,6 the inner and the outer link plates 2,2, 6,6 are pivotally connected with each other.

In a middle portion of the bore of the bushing 3, a cut-away portion 23 to reserve lubricant and to supply it into the clearance between the bushing 3 and the chain pin 9 is formed.

The assembly of bearing rollers 4 is in the shape of a column of a length which is shorter than the length of the roller 5. And the bearing rollers 4 are located in parallel with the center-line of the bushing 3 and, in the embodiment, the bearing rollers 4 are closely disposed around the outer-periphery of the bushing 3, adjoining each other.

The roller 5 has a cylindrical body portion 24 and inner flangs 25, 25 formed at both ends of the body portion 24. The cylindrical body portion 24 has an inner-surface 13 surrounding and encircling the plural bearing rollers 4. The flanges 25, 25 have inside-surfaces 25A extending inwardly along the end-surface 4A of the bearing roller 4 and the inside-surface 25A act to prevent the bearing rollers 4 from shifting. Consequently, the roller 5 may be provided with the cavity portion 26 formed by the body portion 24 and the flanges 24, 25, holding the bearing roller 4 therein. The diameter d2 of the roller 5 is selected to be larger than the width of the inner link plate 2, and a length l of the roller 5 is shorter than the distance L2 between the oppositely disposed inner link plates 2,2. As a result, there is formed gaps where the thrust rings 7, 7 are mounted, between the end-surfaces 5A of the rollers 5 and the inner-surfaces of the inner link plates 2, 2.

The thrust rings 7, 7 are made of bearing material, superior in low frictional resistance and in anti-wear quality, such as synthetic resin, e.g. fluorocarbon resin, acetal resin, oil impregnated sintered metal, ceramic or the like. And also the thrust ring 7 is slightly thinner than the width of said gap and has a center-hole 27 into which the bushing 3 is insertable. Therefore, as shown in FIG. 1, thrust ring 7 is able to be mounted on the bushing 3 relatively close-fitting so as to prevent lubricant such as grease or the like from leaking between the thrust ring 7 and the bushing 3. The diameter d3 of the thrust ring 7 is almost equal to the width of the link plate 2.

In this embodiment, the thrust ring 7 contacts with the end-surface 5A of the roller 5 in the range of 30%-70% of the radial length thereof, preferably, over about 50% of the radial length. An apparent from the foregoing description, the roller chain 1 having the thrust rings 7 placed between the roller 5 and the inner link plate 2, is provided with a lubricant-receiving reservoir 30 which is surrounded by the inside-surface 7A of the thrust ring 7, the inner-surface 25B of the inner flange 25, the outer-periphery of the bushing 3 and the end-surface 4A of the bearing rollers 4 and which communicate with the space between the adjoining bearing rollers 4 . . . .

The roller chain 1 is assembled as in the following. The plural bearing rollers 4 are located in the cavity portion 26, being in contact with the inner-surface 13 thereof. And then the bushing 3 projected from one inner link plate 2 and having one thrust ring 7 thereon is inserted into the bore-like portion formed by the bearing rollers 4 which are disposed circularly thereabout. And the bushing 3 on which other thrust ring 7 is mounted is further press-fitted into the other inner link plate 2. As a result, an inner link having the rollers 5, 5 is assembled. Thereafter, the outer link plates 6, 6 are connected with said inner link by the chain pin 9 passing through the bore in the center of bushing 3.

As explained, since the roller chain 1 of the invention has the rollers 5 mounted on the bushing 3 through the bearing rollers 4, the rolling frictional resistance of the rollers 5 and the running resistance of the chain are reduced. Besides, because the roller 5 is positioned by the inner link plate 2 through the thrust ring 7, the lateral force acting on the roller 5 can be sustained by the inner link plate 2 positively, thus the resistance against the lateral force is increased. Also, since the thrust ring 7 is made of bearing material, the frictional resistance and abrasion caused at both sides thereof are remarkably decreased. Furthermore, since the roller chain 1 can receive large quantity of lubricant such as grease or the like in the reservoir 30, the abrasion of the chain 1 can be effectively reduced for a long time, and durability and life of the chain are increased.

Figure 3:
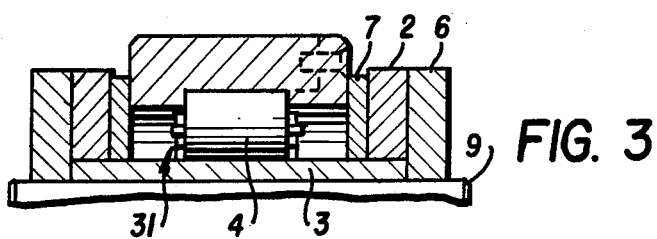
FIG. 3 is a sectional view disclosing another embodiment with a retainer.
Figure 4:
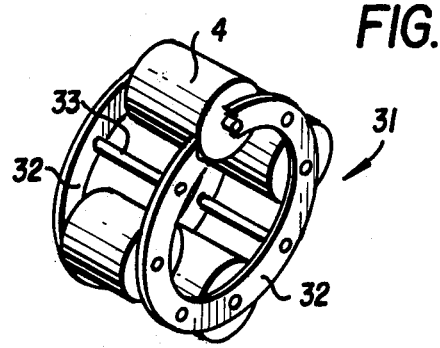
FIG. 4 is a perspective view showing the retainer in FIG. 3.
Figure 5:
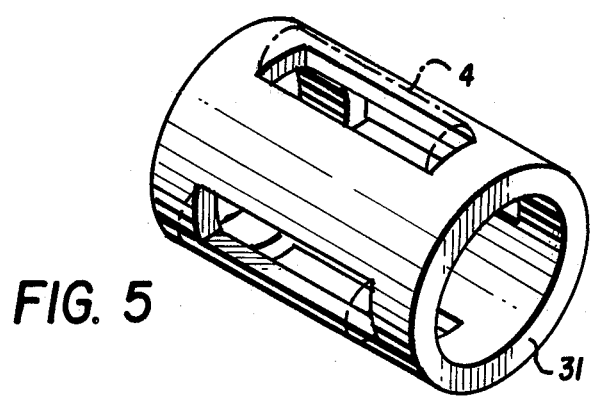
FIG. 5 is a perspective view disclosing another example of a retainer.

FIGS. 3 and 4 show another embodiment of the invention in which the bearing rollers 4 . . . are held by a retainer 31. The retainer 31 comprises the rings 32, 32 which support pivotally stub shafts projecting from the ends of the bearing roller 4 and connecting pin 33 . . . which connect the rings 32, 32. The retainer 31 is assembled in a body after the bearing rollers 4 . . . are placed into the cavity portion 26. Also, as shown in FIG. 3 by chain-lines, one of the inner flanges 25 may be removably mounted onto the roller 5 by screws, enabling use of pre-assembled retainers 31. Furthermore, the retainer 31 may be made of a flexible cylinder that has holes, in which the bearing rollers 4 . . . may be held, as shown in FIG. 5.

Figure 6:
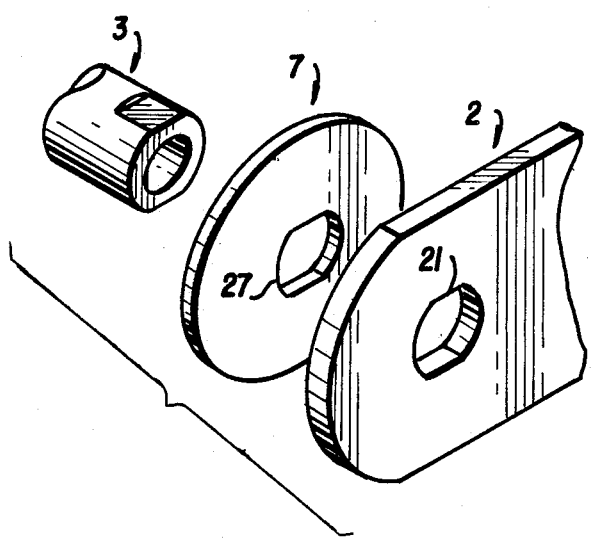
FIG. 6 is an exploded view in perspective disclosing a portion of another embodiment.
Figure 7:
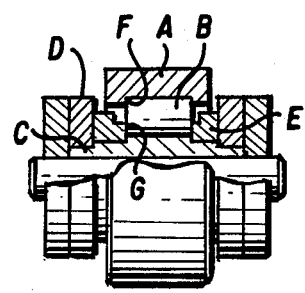
FIG. 7 is a sectional view disclosing a conventional roller chain.

FIG. 6 shows a roller chain 1 of this invention in which the pitch hole 21 of the inner link plate 2 and the hole 27 of the thrust ring 7 are formed in the shape of non-circular hole, into which the end portion of the bushing 3 in the same shape is insertable thereinto, resulting in improvement of the fitting force, to prevent the thrust rings 7, 7 from turning.

EFFECTS OF THE INVENTION

As explained in above detailed description, the roller chain of this invention can reduce the rolling resistance of the roller and running resistance thereof. Furthermore, the bearing rollers as well as the rollers are prevented from lateral shifting owing to the thrust rings placed between the roller and the inner link plates. Therefore, the roller chain can sustain the thrust load acting on the rollers by inner link plates, and can be remarkably improved in durability against lateral load. Furthermore, because the thrust ring being made of bearing material such as synthetic resin or the like, the durability and the life of the roller chain can be increased.

As many apparently widely different embodiments of this invention may be made without parting from the spirit and scope thereof, it is to be understood that the invention is not limited to the specific embodiments thereof except defined in the appended claims.

We claim:

1. A roller chain comprising:
   inner link plates oppositely disposed in parallel;
   a bushing interconnecting said inner link plates;
   plural bearing rollers located around the outer periphery of said bushing in parallel with the center line of said bushing;
   a generally annular shaped roller provided with a cylindrical body portion having an inner periphery surrounding said bearing rollers and in contact therewith;
   radially inwardly extending flanges formed at both ends of said body portion, each flange having an inside surface extending radially inwardly along end surfaces of said bearing rollers and each flange having an inner periphery spaced from the adjacent outer periphery of said bushing;
   thrust rings made of bearing material in the shape of a disk plate mounted on said bushing in a relatively closely fitting manner and located between the axial end surfaces of the radially inwardly extending flanges of said roller and one of inner surfaces of said link plates and having a flat axial inside surface; and
   a closed annular lubricant reservoir defined by the inner periphery of said flange, the end surfaces of said plural bearings, the outer periphery of said bushing and the axial inside surface of said thrust ring.

2. A roller chain as claimed in claim 1, wherein said bearing material is synthetic resin.

3. A roller chain as claimed in claim 1, wherein said bearing material is oil impregnated sintered metal.

4. A roller chain as claimed in claim 1, wherein said thrust ring contacts with the end-surface of said roller in the range of 30%-70% of radial length of said end-surface of said roller.

5. The roller chain of claim 1 including a retainer means to hold said plural bearing rollers in circumferentially spaced relationship.

6. The roller chain of claim 5 in which said plural bearing rollers have stub shafts projecting from their axial ends and the retainer means is a pair of ring-shaped members having circumferentially spaced aperture to receive said stub shaft.

7. The roller chain of claim 5 in which said retainer means is an annular body of flexible material having a plurality of aperture on its periphery to receive said plural bearing rollers.

8. The roller chain of claim 1 in which the end portion of said bushing is of non-circular shape and the thrust rings have an aperture of similar shape so as to be non-rotating in relation to said bushing.

9. The roller chain of claim 1 in which one of said radially inwardly extending flanges is detachably secured to said roller.

* * * * *